(12) United States Patent
Kim et al.

(10) Patent No.: US 9,876,221 B2
(45) Date of Patent: Jan. 23, 2018

(54) NEGATIVE ACTIVE MATERIAL FOR RECHARGEABLE LITHIUM BATTERY AND RECHARGEABLE LITHIUM BATTERY INCLUDING SAME

(75) Inventors: Bong-Chull Kim, Yongin-si (KR); Cheol-Hee Hwang, Yongin-si (KR); Dong-Yung Kim, Yongin-si (KR); Se-Ho Park, Yongin-si (KR); Hyun-Jun Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 641 days.

(21) Appl. No.: 13/100,273

(22) Filed: May 3, 2011

(65) Prior Publication Data
US 2011/0281180 A1 Nov. 17, 2011

Related U.S. Application Data

(60) Provisional application No. 61/345,014, filed on May 14, 2010.

(51) Int. Cl.
| | |
|---|---|
| H01M 4/583 | (2010.01) |
| H01M 4/133 | (2010.01) |
| H01M 4/38 | (2006.01) |
| H01M 4/134 | (2010.01) |
| H01M 4/36 | (2006.01) |
| H01M 10/0525 | (2010.01) |
| H01M 10/0567 | (2010.01) |
| H01M 4/587 | (2010.01) |

(52) U.S. Cl.
CPC .......... *H01M 4/133* (2013.01); *H01M 4/134* (2013.01); *H01M 4/362* (2013.01); *H01M 4/386* (2013.01); *H01M 4/587* (2013.01); *H01M 10/0525* (2013.01); *H01M 10/0567* (2013.01)

(58) Field of Classification Search
CPC .............................. H01M 4/583; Y02E 60/12
See application file for complete search history.

(56) References Cited

U.S. PATENT DOCUMENTS

| | | | |
|---|---|---|---|
| 6,235,427 B1 | 5/2001 | Idota et al. | |
| 7,736,804 B2 | 6/2010 | Kim et al. | |
| 7,833,662 B2 | 11/2010 | Kim et al. | |
| 2002/0164479 A1 | 11/2002 | Matsubara et al. | |
| 2003/0215711 A1* | 11/2003 | Aramata et al. | 429/218.1 |
| 2004/0197660 A1 | 10/2004 | Sheem et al. | |
| 2006/0127773 A1* | 6/2006 | Kawakami et al. | 429/245 |
| 2007/0190413 A1 | 8/2007 | Lee et al. | |
| 2008/0020282 A1 | 1/2008 | Kim et al. | |
| 2008/0166634 A1* | 7/2008 | Kim et al. | 429/218.1 |
| 2008/0286657 A1 | 11/2008 | Hasegawa et al. | |
| 2009/0042102 A1* | 2/2009 | Cui et al. | 429/231.95 |
| 2009/0136847 A1 | 5/2009 | Jeong et al. | |
| 2009/0162750 A1* | 6/2009 | Kawakami et al. | 429/218.1 |
| 2009/0269669 A1* | 10/2009 | Kim et al. | 429/231.8 |
| 2010/0176337 A1* | 7/2010 | Zhamu et al. | 252/182.1 |
| 2012/0301789 A1* | 11/2012 | Loveness et al. | 429/232 |

FOREIGN PATENT DOCUMENTS

| | | |
|---|---|---|
| CN | 1521873 A | 8/2004 |
| EP | 1 205 989 A2 | 5/2002 |
| EP | 1 313 158 A2 | 5/2003 |
| JP | 2005-166414 A | 6/2005 |
| JP | 2008-27912 A | 2/2008 |
| JP | 2008123814 A | 5/2008 |
| JP | 2009-266795 A | 11/2009 |
| JP | 2009-289680 A | 12/2009 |
| KR | 10-2007-0034254 A | 3/2007 |
| KR | 10-0851969 | 8/2008 |
| KR | 10-0898293 B1 | 5/2009 |
| KR | 10-2009-0114130 | 11/2009 |
| WO | WO 2007/108217 A1 | 9/2007 |

OTHER PUBLICATIONS

Drabold et al., "Defects in Amorphous Semiconductors: Amorphous Silicon" Topics Appl. Physics 104, 245-268, 2007.*
Korean Office Action for Application No. 10-2011-0044691, dated Nov. 19, 2012, 6 pgs.
Patent Abstracts of Japan, and English machine translation of Japanese Publication 2008-123814, previously submitted in an IDS dated May 3, 2011, 20 pages.
Extended European Search Report dated Aug. 22, 2011, for European application 11250510.2, which claims priority to the present application, 7 pps.
Japanese Patent Office action dated Dec. 18, 2012 in corresponding application No. JP 2011-108161 (2 pages).
SIPO Office action dated Aug. 5, 2013 in CN application No. 201110115055.3, with English translation (16 pages).
KIPO Office action dated Aug. 30, 2013 in KR application No. 10-2011-0044691 (5 pages).
EPO Office action dated May 23, 2013, for corresponding European Patent application 11250510.2, (8 pages).
Chinese Office action for Chinese Application No. 201110115055.3, dated Apr. 8, 2014, 9 pages.
English translation Chinese Office action for Chinese Application No. 201110115055.3, dated Apr. 8, 2014, 9 pages.
SIPO Office action dated Sep. 19, 2014, with English translation, for corresponding Chinese Patent application 201110115055.3, (17 pages).
SIPO Office action dated Mar. 25, 2015, with English translation, corresponding to Chinese Patent application 201110115055.3, (6 pages).

\* cited by examiner

*Primary Examiner* — Ladan Mohaddes
(74) *Attorney, Agent, or Firm* — Lewis Roca Rothgerber Christie LLP

(57) ABSTRACT

Embodiments of the present invention are directed to negative active materials for lithium rechargeable batteries and to lithium rechargeable batteries including the negative active materials. The negative active material includes a crystalline carbon material having pores, and amorphous conductive nanoparticles in the pores, on the surface of the crystalline carbon, or both in the pores and on the surface of the crystalline carbon. The conductive nanoparticles have a FWHM of about 0.35 degrees (°) or greater at the crystal plane that produces the highest peak as measured by X-ray diffraction.

18 Claims, 4 Drawing Sheets

NEGATIVE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATIONS

This application claims priority to and the benefit of Provisional Patent Application No. 61/345,014 filed in the U.S. Patent and Trademark Office on May 14, 2010, the entire contents of which are incorporated herein by reference.

BACKGROUND OF THE INVENTION

1. Field of the Invention

This disclosure relates to negative active materials for lithium rechargeable batteries and to lithium rechargeable batteries including the same.

2. Description of the Related Art

Lithium rechargeable batteries have recently drawn attention as power sources for small, portable electronic devices. They use an organic electrolyte solution and thus have twice the discharge voltage of conventional batteries using alkaline aqueous solutions. Accordingly, lithium rechargeable batteries have high energy densities.

As the positive active material of a rechargeable lithium battery, lithium-transition element composite oxides capable of intercalating lithium (such as $LiCoO_2$, $LiMn_2O_4$, $LiNi_{1-x}Co_xO_2$ ($0<x<1$), and so on) have been researched.

As the negative active material of a rechargeable lithium battery, various carbon-based materials (such as artificial graphite, natural graphite, and hard carbon), capable of intercalating and deintercalating lithium ions, have been used. However, due to the need for stability and high-capacity, recent research has been conducted into non-carbon-based negative active materials (such as Si).

SUMMARY OF THE INVENTION

According to embodiments of the present invention, a negative active material for a rechargeable lithium battery has improved cycle-life.

Embodiments of the invention are directed to a method of preparing the negative active material.

Other embodiments are directed to a rechargeable lithium battery including the negative active material.

According to some embodiments, a negative active material for a rechargeable lithium battery includes a crystalline carbon material having pores, and amorphous conductive nanoparticles dispersed inside the pores, on the surface of the crystalline carbon, or both inside the pores and on the surface of the crystalline carbon. The conductive nanoparticles have a full width at half maximum (FWHM) of about 0.35 degrees (°) or greater at a crystal plane that produces the highest peak as measured by X-ray diffraction.

In some embodiments, the conductive nanoparticles may include nanoparticles having a FWHM of about 0.35 degrees or greater at a (111) plane as measured by X-ray diffraction.

The crystalline carbon material may include natural graphite, artificial graphite, or a mixture thereof.

The crystalline carbon material having pores may have a porosity of about 15% to about 50%.

The conductive nanoparticles may include a material selected from silicon (Si), silicon-containing alloys (Si—X) (where X is selected from alkaline metals, alkaline-earth metals, group 13 elements, group 14 elements, group 15 elements, group 16 elements, transition elements, rare earth elements, and combinations thereof, but is not Si), tin (Sn), tin-containing alloys (Sn—X') (where X' is selected from alkaline metals, alkaline-earth metals, group 13 elements, group 14 elements, group 15 elements, group 16 elements, transition elements, rare earth elements, and combinations thereof, but is not Sn), lead (Pb), indium (In), arsenic (As), antimony (Sb), silver (Ag), and combinations thereof. For example, X and X may be independently selected from magnesium (Mg), calcium (Ca), strontium (Sr), barium (Ba), scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), technetium (Tc), rhenium (Re), iron (Fe), ruthenium (Ru), osmium (Os), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), indium (In), germanium (Ge), phosphorus (P), arsenic (As), antimony (Sb), bismuth (Bi), sulfur (S), selenium (Se), tellurium (Te), and combinations thereof.

In consideration of the manufacturing process and improvements in cycle-life, the conductive nanoparticles may have an average particle diameter of about 50 nm to about 200 nm. In some embodiments, for example, the conductive nanoparticles have an average particle diameter of about 60 nm to about 180 nm.

In some embodiments, the conductive nanoparticles may be present in the negative active material in an amount of about 5 to about 25 parts by weight based on 100 parts by weight of the crystalline carbon material.

According to other embodiments of the invention, the negative active material may further include amorphous carbon at least partially surrounding the crystalline carbon material. The amorphous carbon may include soft carbon (low temperature baked carbon), hard carbon, mesophase pitch carbide, baked coke, or a mixture thereof. The amorphous carbon may be present in the negative active material in an amount of about 5 to about 25 parts by weight based on 100 parts by weight of the crystalline carbon material.

According to other embodiments, a method of manufacturing a negative active material includes milling conductive particles using beads having an average particle diameter of about 50 to about 150 μm for about 24 hours or longer to provide conductive nanoparticles, and mixing the conductive nanoparticles with a crystalline carbon material having pores.

The beads may include metal oxide beads, metal nitride beads, metal carbide beads, or a combination thereof. For example, the beads may include zirconia beads, alumina beads, silicon nitride beads, silicon carbide beads, silica beads, or a combination thereof.

According to yet other embodiments, a rechargeable lithium battery includes a negative electrode including the negative active material, a positive electrode including a positive active material, and a non-aqueous electrolyte. The negative electrode may include a mixture of the negative active material described above and crystalline carbon.

The non-aqueous electrolyte may include a non-aqueous organic solvent and a lithium salt, and the non-aqueous organic solvent may include a material selected from vinylene carbonate, ethylene carbonate-based compounds of the following Chemical Formula 2, or a combination thereof.

Chemical Formula 2

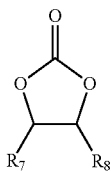

In Chemical Formula 2, $R_7$ and $R_8$ may be the same or different, and may be selected from hydrogen, halogens, cyano groups (CN), nitro groups ($NO_2$), and C1 to C5 fluoroalkyl groups, provided that at least one of $R_7$ and $R_8$ is selected from halogens, cyano groups (CN), nitro groups ($NO_2$), and C1 to C5 fluoroalkyl groups (i.e., at least one of $R_7$ and $R_8$ is not hydrogen).

In the non-aqueous organic solvent, the material selected from vinylene carbonate, ethylene carbonate-based compounds of Chemical Formula 2, and combinations thereof may be present in an amount of about 15 to about 30 volume % based on the total volume of the non-aqueous organic solvent.

The negative active materials for lithium rechargeable batteries according to embodiments of the present invention improve battery cycle-life.

DETAILED DESCRIPTION OF THE INVENTION

Exemplary embodiments will now be described. However, these embodiments are exemplary and this disclosure is not limited thereto.

The negative active material according to embodiments of the present invention includes a carbon-nanoparticle composite including a crystalline carbon material having pores, and amorphous conductive nanoparticles dispersed inside the pores, on the surface of the crystalline carbon material, or both inside the pores and on the surface of the crystalline carbon material. As used herein, the crystalline carbon material may include an agglomerate of at least two crystalline carbon particles. As used herein, the conductive nanoparticles may include any conductive or semi-conductive material capable of alloying with Li ions electrochemically. In some embodiments, the conductive nanoparticles may include any conductive or semi-conductive materials, and may have different potentials when reacting with Li ions electrochemically (depending on the kind of material), but electrochemically react with Li ions at a low potential.

Figure 1:
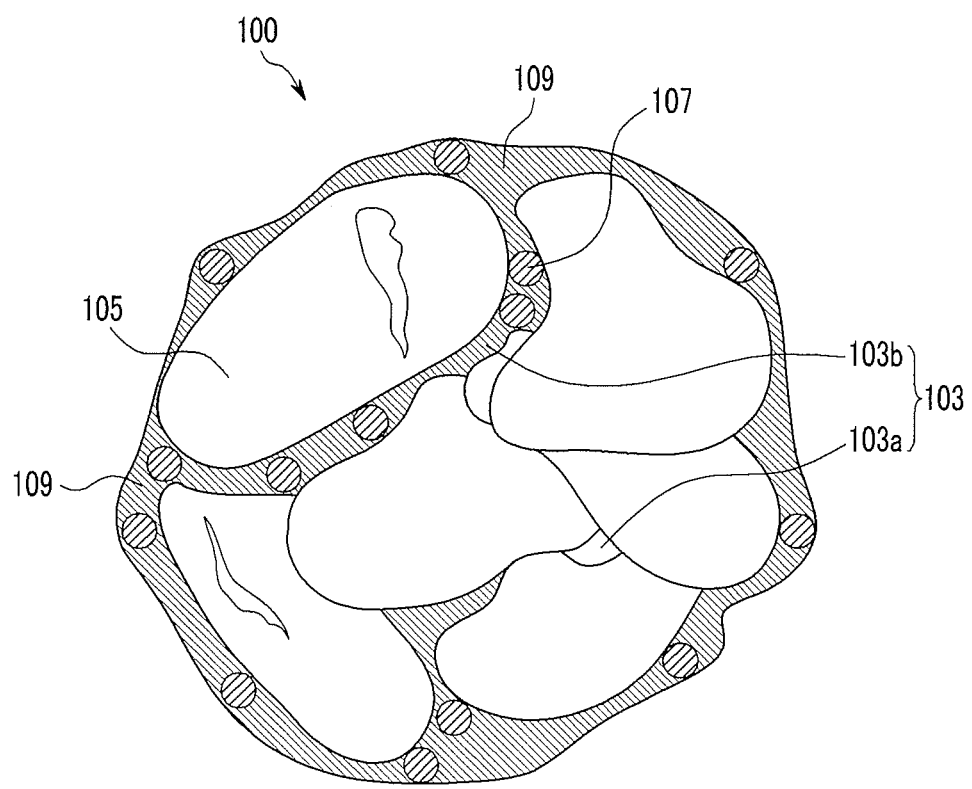
FIG. 1 is a schematic view of a negative active material according to one embodiment of the present invention.
Figure 2:
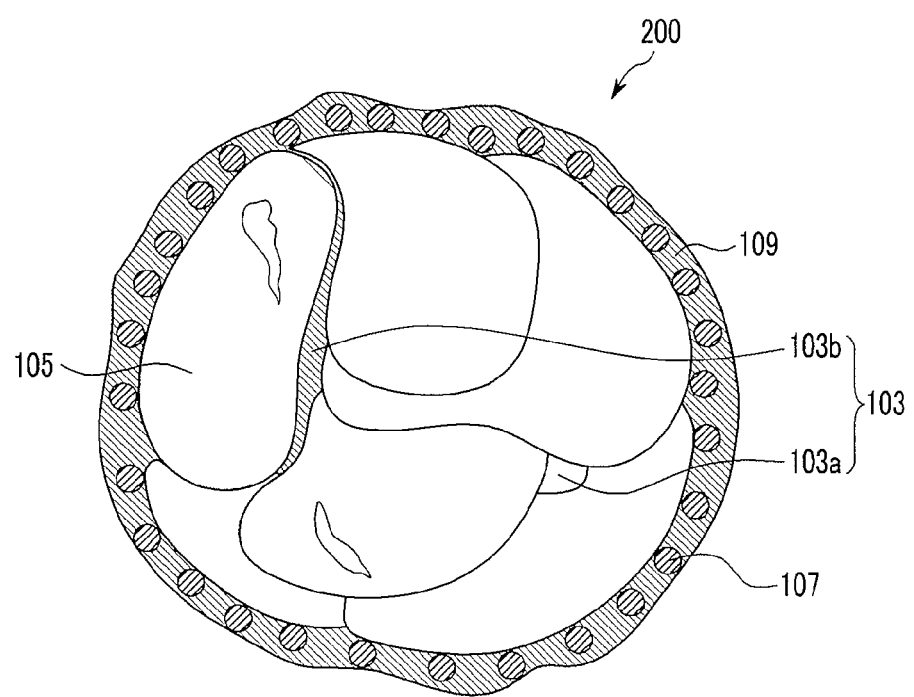
FIG. 2 is a schematic view of a negative active material according to another embodiment of the present invention.

FIGS. 1 and 2 illustrated some exemplary structures of the negative active materials according to the present invention, but these structures are exemplary and do not limit the scope of the invention.

Referring to FIG. 1, a negative active material 100 according to one embodiment includes a crystalline carbon material 105 including pores 103, and conductive nanoparticles 107 dispersed inside the pores 103. The conductive nanoparticles 107 have a FWHM of about 0.35 degrees (°) or greater at the crystal plane that produces the highest peak as measured by X-ray diffraction.

FIG. 2 is a schematic view of a negative active material 200 according to another embodiment of the present invention, in which the conductive nanoparticles 107 are disposed on the surface of the crystalline carbon material 105 and not inside the pores 103 of the crystalline carbon material 105.

The crystalline carbon material 105 including the pores 103 buffers the volume expansion of the conductive nanoparticles 107 during charge and discharge, and improves the electrical conductivity of the negative active materials 100 and 200.

The crystalline carbon material 105 may include a material capable of intercalating and deintercalating lithium ions, and may be natural graphite, artificial graphite, or a mixture thereof.

When the crystalline carbon material 105 is graphite, the crystalline carbon material 105 is generally manufactured in a spherical shape by agglomerating flake-shaped graphite fine powders or massive graphite fine powders. The graphite fine powders are agglomerated by dropping graphite fine powders from a suitable height (e.g., a predetermined height) in an agglomerating apparatus, colliding the edges of the fine powders with the walls of the apparatus, and bending the edges.

The fine powders of the crystalline carbon material 105 may have a particle size of about 1 μm to about 5 μm. When the particle size is less than about 1 μm, the expansion buffering effect is insufficient since the porosity of the carbon material 105 imparted by the pores 103 is less than about 15%. When the particle size is greater than about 5 μm, the strength of the crystalline carbon material 105 is not sufficient since the porosity of the carbon material 105 imparted by the pores 103 is more than about 50%.

The crystalline carbon material 105 may be spherical or entirely spherical in shape. Alternatively, the crystalline carbon material 105 may be formed in a conical or cylindrical shape.

Alternative methods for agglomerating flake-shaped graphite as the crystalline carbon material 105 include providing the flake-shaped graphite in an air flow, colliding them with a wall surface of a crusher, and folding and bending the edges of the flake-shaped graphite.

During the agglomeration process of the fine powders of the crystalline carbon material 105, pores 103 may be formed inside the crystalline carbon 105. Further, such pores 103 may be formed using a blowing agent. The pores 103 include closed pores 103a and/or open pores 103b inside the crystalline carbon material 105. The pores 103 may provide a three-dimensional network. The pores 103 inside the crystalline carbon 105 may promote buffering during charge/discharge when the conductive nanoparticles 107 (such as Si nanoparticles) undergo volume expansion.

The pores 103 may impart a porosity to the crystalline carbon material of about 15% to about 50%. When the crystalline carbon material has a porosity within this range, the negative active material may successfully buffer volume expansion as well as sufficiently maintain mechanical strength.

The conductive nanoparticles 107 may be dispersed inside the pores 103 or on the surface of the crystalline carbon material 105.

When the conductive nanoparticles 107 have a full width at half maximum of about 0.35° at the crystal plane that produces the highest peak measured by X-ray diffraction using a CuKα ray, the conductive nanoparticles 107 are amorphous. The conductive nanoparticles 107 may have no peak or a broad peak at the crystal plane that produces the highest peak. For example, silicon nanoparticles may have a FWHM of about 0.35 degrees or greater at a (111) plane as measured by X-ray diffraction. When the conductive nanoparticles have a FWHM of less than about 0.35°, they may not improve the cycle-life of the battery.

The conductive nanoparticles 107 may have an average particle diameter of about 50 nm to about 200 nm. In some embodiments, for example, the conductive nanoparticles have an average particle diameter of about 60 nm to about 180 nm. When the conductive nanoparticles 107 have an average particle diameter within these ranges, they can suppress volume expansion generated during charge and discharge, and substantially prevent a conductive path from being blocked by particles that are broken during charge and discharge.

In general, conductive particles that are several micrometers in size may cause a conductive path to be cut due to particles being broken when the battery is repeatedly charged and discharged, leading to severe capacity deterioration. However, when the conductive particles are nano-sized particles and amorphous (according to some embodiments of the present invention), they may substantially prevent the conductive path from being cut during charge and discharge, thereby improving the cycle-life characteristics of the battery.

The conductive particles may include a material selected from silicon (Si), silicon-containing alloys (Si—X) (where X is selected from alkaline metals, alkaline-earth metals, group 13 elements, group 14 elements, group 15 elements, group 16 elements, transition elements, rare earth elements, and combinations thereof, but is not Si), tin (Sn), tin-containing alloys (Sn—X') (where X' is selected from alkaline metals, alkaline-earth metals, group 13 elements, group 14 elements, group 15 elements, group 16 elements, transition elements, rare earth elements, and combinations thereof, but is not Sn), lead (Pb), indium (In), arsenic (As), antimony (Sb), silver (Ag), and combinations thereof. For example, X and X' may be independently selected from magnesium (Mg), calcium (Ca), strontium (Sr), barium (Ba), scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), technetium (Tc), rhenium (Re), iron (Fe), ruthenium (Ru), osmium (Os), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), indium (In), germanium (Ge), phosphorus (P), arsenic (As), antimony (Sb), bismuth (Bi), sulfur (S), selenium (Se), tellurium (Te), and combinations thereof.

According to some embodiments, the conductive nanoparticles 107 may be present in an amount of about 5 to about 25 parts by weight based on 100 parts by weight of the crystalline carbon material 105. When the conductive nanoparticles 107 are present in an amount within this range, they may increase capacity per weight by about 1.5 to about 3 times that of the crystalline carbon material alone.

The negative active material 100 may further include amorphous carbon 109 at least partially surrounding the crystalline carbon 105. In some embodiments, the amorphous carbon 109 may fill the space inside the pores 103 in which the conductive nanoparticles 107 may be disposed.

The amorphous carbon 109 may include soft carbon (carbon baked at a low temperature), hard carbon, a mesophase pitch carbonized product, baked coke, or a mixture thereof.

According to some embodiments, the amorphous carbon 109 included in the negative active material 100 may separate the plurality of conductive nanoparticles 107 from each other, and/or separate the conductive nanoparticles 107 and the pore wall of the pores in the crystalline carbon material 105. In other words, the amorphous carbon 109 may substantially surround the conductive nanoparticles 107, so that the conductive nanoparticles 107 may not directly contact the pore wall of the pores of the crystalline carbon material 105. As used herein, the term "substantially surround" means that a majority of the nanoparticle is surrounded by the amorphous carbon such that the majority of the nanoparticle does not directly contact the pore walls. Accordingly, volume expansion of the conductive nanoparticles 107 may be suppressed despite repeated charge and discharge.

The conductive nanoparticles 107 may be further disposed on the external surface of the crystalline carbon material 105. The amorphous carbon 109 may be disposed over the conductive nanoparticles 107 and the crystalline carbon material 105, for example, the amorphous carbon 109 may cover the conductive nanoparticles 107 and the crystalline carbon material 105.

The amorphous carbon 109 may be present in an amount of about 5 to about 25 parts by weight based on 100 parts by weight of the crystalline carbon material 105. When the amorphous carbon 109 is present in an amount within this range, the plurality of conductive nanoparticles 107 may be sufficiently separated from the internal surface of the pores 103.

The negative active materials 100 and 200 may have an average particle diameter of about 5 to about 40 μm. This negative active material may be mixed with a second crystalline carbon constituent. The second crystalline carbon constituent may include natural graphite, artificial graphite, or a combination thereof. When the crystalline carbon material 105 (included in the negative active materials 100 and 200) is natural graphite, artificial graphite may be used as the second crystalline carbon constituent and mixed with the negative active material.

According to some embodiments, the negative active material may be prepared by the following process.

First, amorphous conductive nanoparticles are prepared by milling conductive particles for 24 hours or longer using beads with an average particle diameter of about 50 μm to about 150 μm.

The beads may include metal oxide beads, metal nitride beads, or metal carbide beads. Nonlimiting examples of suitable beads include zirconia beads, alumina beads, silicon nitride beads, silicon carbide beads, silica beads, and the like. The beads may have a Vickers hardness (load: 500 g) of about 8 to about 25 GPa. In some embodiments, for example, the beads have a Vickers hardness of about 10 to about 23 GPa.

The milling process may be performed for about 24 to about 400 hours. The conductive nanoparticles milled with the beads may have an average particle diameter of about 50 nm to about 200 nm. In some embodiments, the conductive nanoparticles have an average particle diameter of about 60 nm to about 180 nm. The conductive nanoparticles are sufficiently amorphous to have a full width at half maximum of 0.35° or greater at the crystal plane producing the highest peak as measured by X-ray diffraction using a CuKαray.

The conductive nanoparticles are mixed with the crystalline carbon material in a solvent. The solvent may include a non-aqueous solvent, for example, an alcohol, toluene, benzene, or a combination thereof.

The conductive nanoparticles may be dispersed inside the pores of the crystalline carbon material by capillary action. In addition, the conductive nanoparticles may exist not inside the pores of the crystalline carbon material but on the surface thereof. The acquired carbon-nanoparticle composite is mixed with an amorphous carbon precursor in a solvent. The mixture is heat-treated. Nonlimiting examples of the amorphous carbon precursor include coal pitch, mesophase pitch, petroleum pitch, coal-based oil, heavy oil, and polymer resins (such as phenol resins, furan resins, polyimide resins, and the like).

According to some embodiments, the crystalline carbon material may be present in the final product in an amount of about 70 wt % to about 90 wt %, the conductive nanoparticles may be present in the final product in an amount of about 5 to about 15 wt %, and the amorphous carbon may be present in the final product in an amount of about 5 wt % to about 15 wt %. In addition, the amount of the amorphous carbon precursor present in the mixture of the carbon-nanoparticle composite and the precursor is not particularly limited, but may be about 15 wt % based on the entire amount of the mixture.

The heat treatment may be performed at a temperature of about 600° C. to about 1200° C. The heat treatment carbonizes the amorphous carbon precursor and converts it into amorphous carbon. Thus, the amorphous carbon substantially surrounds and coats the crystalline carbon core and the conductive nanoparticles on the surface of the core.

According to other embodiments, a rechargeable lithium battery includes a negative electrode including a negative active material, a positive electrode including a positive active material, and a non-aqueous electrolyte.

The negative electrode includes a current collector and a negative active material layer formed on the current collector. The negative active material layer includes the negative active material described above. The negative active material layer may include about 95 to about 99 wt % of the negative active material based on the total weight of the negative active material layer.

The negative active material layer may further include a binder, and optionally a conductive material. The negative active material layer may include about 1 wt % to about 5 wt % of the binder based on the total weight of the negative active material layer. In addition, when the negative active material layer further includes a conductive material, it may include about 90 wt % to about 98 wt % of the negative active material, about 1 wt % to about 5 wt % of the binder, and about 1 wt % to about 5 wt % of the conductive material.

The binder improves the binding properties of the active material particles to each other and to the current collector. The binder may include a non-water-soluble binder, a water-soluble binder, or a combination thereof.

Nonlimiting examples of the non-water-soluble binder include polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, polyamideimide, polyimide, and combinations thereof.

Nonlimiting examples of the water-soluble binder include styrene-butadiene rubbers, acrylated styrene-butadiene rubbers, polyvinyl alcohol, sodium polyacrylate, homopolymers or copolymers of propylene and a C2 to C8 olefin, copolymers of (meth)acrylic acid and (meth)acrylic acid alkyl ester, and combinations thereof.

When the water-soluble binder is used as a negative electrode binder, a cellulose-based compound may be further used to provide viscosity. The cellulose-based compound may include one or more of carboxymethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount of 0.1 to 3 parts by weight based on 100 parts by weight of the binder.

As for the conductive material, any electro-conductive material that does not cause a chemical change may be used. Non-limiting examples of the conductive material include carbon-based materials (such as natural graphite, artificial graphite, carbon black, acetylene black, ketjen black, and carbon fibers), metal-based materials (such as metal powders or metal fibers including copper, nickel, aluminum, and silver), conductive polymers (such as polyphenylene derivatives), and mixtures thereof.

The negative electrode includes a current collector, and the current collector may include a copper foil, a nickel foil, a stainless steel foil, a titanium foil, a nickel foam, a copper foam, a polymer substrate coated with a conductive metal, or combinations thereof.

The positive electrode includes a current collector and a positive active material layer disposed on the current collector. The positive active material may include a lithiated intercalation compound that reversibly intercalates and deintercalates lithium ions. The positive active material may include a composite oxide including at least one selected from cobalt, manganese, and nickel, as well as lithium. In particular, the following compounds may be used.

$Li_aA_{1-b}X_bD_2$ ($0.90 \leq a \leq 1.8$, $0 \leq b \leq 0.5$)
$Li_aA_{1-b}X_bO_{2-c}D_c$ ($0.90 \leq a \leq 1.8$, $0 \leq c \leq 0.05$)
$Li_aE_{1-b}X_bO_{2-c}D_c$ ($0 \leq b \leq 0.5$, $0 \leq c \leq 0.05$)
$Li_aE_{2-b}X_bO_{4-c}D_c$ ($0 \leq b \leq 0.5$, $0 \leq c \leq 0.05$)
$Li_aNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$)
$Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$)
$Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$)
$Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$)
$Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$)
$Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$)
$Li_aNi_bE_cG_dO_2$ ($0.90 \leq a \leq 1.8$, $0 \leq b \leq 0.9$, $0 \leq c \leq 0.05$, $0.001 < d \leq 0.1$)
$Li_a Ni_bCo_cMn_dG_eO_2$ ($0.90 \leq a \leq 1.8$, $0 \leq b \leq 0.9$, $0 \leq c \leq 0.05$, $0 \leq d \leq 0.5$, $0.001 \leq e \leq 0.1$)
$Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$)
$Li_aMn_{1-b}G_bO_2$ ($0.90 \leq a \leq 1.8$, $0.001 \leq b \leq 0.1$)
$Li_aMn_2G_bO_4$ ($0.90 \leq a \leq 1.8$, $0.001 \leq b \leq 0.1$)
$Li_aMn_{1-g}G_gPO_4$ ($0.90 \leq a \leq 1.8$, $0 \leq b \leq 0.5$)
$QO_2$
$QS_2$
$LiQS_2$
$V_2O_5$
$LiV_2O_5$
$LiZO_2$
$LiNiVO_4$
$Li_{(3-f)}J_2(PO_4)_3$ ($0 \leq f \leq 2$)
$Li_{(3-f)}Fe_2(PO_4)_3$ ($0 \leq f \leq 2$)
$LiFePO_4$ In the above formulas, A may be selected from Ni, Co, Mn, and combinations thereof. X may be selected from Al, Ni, Co, Mn, Cr, Fe, Mg, Sr, V, rare earth elements, and combinations thereof. D may be selected from O, F, S, P, and combinations thereof. E may be selected from Co, Mn, and combinations thereof. T may be selected from F, S, P, and combinations thereof. G may be selected from Al, Cr, Mn, Fe, Mg, La, Ce, Sr, V, and combinations thereof. Q may be selected from Ti, Mo, Mn, and combinations thereof. Z may be selected from Cr, V, Fe, Sc, Y, and combinations thereof. J may be selected from V, Cr, Mn, Co, Ni, Cu, and combinations thereof.

The lithium-containing compound may have a coating layer on its surface, or may be mixed with another compound having a coating layer. The coating layer may include at least one coating element compound selected from oxides of a coating element, hydroxides of a coating element, oxyhydroxides of a coating element, oxycarbonates of a coating element, and hydroxyl carbonates of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be formed by any method so long as the method does not adversely influence the properties of the positive active material. For example, the method may include any coating method such as spray coating, dipping, and the like.

The positive active material may be present in an amount of about 90 to about 98 wt % based on the total weight of the positive active material layer.

The positive active material layer may also include a binder and a conductive material. Each of the binder and the conductive material may be included in an amount of about 1 to about 5 wt % based on the total weight of the positive active material layer.

The binder improves the binding properties of the positive active material particles to each other, and also to the current collector. Nonlimiting examples of the binder include polyvinyl alcohol, carboxymethyl cellulose, hydroxypropyl cellulose, diacetyl cellulose, polyvinyl chloride, carboxylated polyvinyl chloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like.

The conductive material may be included to improve electrode conductivity. Any electrically conductive material may be used as the conductive material so long as it does not cause a chemical change. Nonlimiting examples of the conductive material include natural graphite, artificial graphite, carbon black, acetylene black, ketjen black, carbon fibers, metal powders or metal fibers (including copper, nickel, aluminum, silver, and the like), polyphenylene derivatives, and combinations thereof.

The current collector may be aluminum (Al) but is not limited thereto.

The negative and positive electrodes may be fabricated by a method including mixing the active material, a conductive material, and a binder into an active material composition, and coating the composition on a current collector. The solvent may include N-methylpyrrolidone or the like, but is not limited thereto. In addition, when a water-soluble binder is used for the negative electrode, water may be used as the solvent to prepare the negative active material composition.

In a non-aqueous electrolyte rechargeable battery according to embodiments of the present invention, the non-aqueous electrolyte may include a non-aqueous organic solvent and a lithium salt.

The non-aqueous organic solvent serves as a medium for transmitting the ions taking part in the electrochemical reaction of the battery. The non-aqueous organic solvent may include a carbonate-based, ester-based, ether-based, ketone-based, alcohol-based, or aprotic solvent.

Nonlimiting examples of carbonate-based solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like.

Nonlimiting examples of ester-based solvents include methyl acetate, ethyl acetate, n-propyl acetate, methylpropionate, ethylpropionate, γ-butyrolactone, decanolide, valerolactone, mevalonolactone, caprolactone, and the like.

Nonlimiting examples of ether-based solvents include dibutyl ether, tetraglyme, diglyme, dimethoxyethane, 2-methyltetrahydrofuran, tetrahydrofuran, and the like.

Nonlimiting examples of ketone-based solvents include cyclohexanone and the like.

Nonlimiting examples of alcohol-based solvents include ethyl alcohol, isopropyl alcohol, and the like.

Nonlimiting examples of aprotic solvents include nitriles (such as R—CN where R is a C2 to C20 linear, branched, or cyclic hydrocarbon-based moiety and may include a double bond, an aromatic ring, or an ether bond), amides (such as dimethylformamide), dioxolanes (such as 1,3-dioxolane), sulfolanes, and the like.

A single non-aqueous organic solvent or a mixture of solvents may be used. When the organic solvent is a mixture, the mixture ratio can be adjusted in accordance with the desired battery performance.

The carbonate-based solvent may include a mixture of a cyclic carbonate and a chain (linear or branched) carbonate. The cyclic carbonate and the chain carbonate may be mixed together in a volume ratio of about 1:1 to about 1:9. When the mixture is used as the non-aqueous organic solvent, the electrolyte performance may be enhanced.

In addition, the non-aqueous organic electrolyte may further include mixtures of carbonate-based solvents and aromatic hydrocarbon-based solvents. The carbonate-based solvents and the aromatic hydrocarbon-based solvents may be mixed together in a volume ratio of about 1:1 to about 30:1.

The aromatic hydrocarbon-based organic solvent may be represented by the following Chemical Formula 1.

Chemical Formula 1

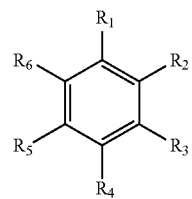

In Chemical Formula 1, each of $R_1$ to $R_6$ is independently selected from hydrogen, halogens, C1 to C10 alkyl groups, C1 to C10 haloalkyl groups, and combinations thereof.

Nonlimiting examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The non-aqueous electrolyte may further include a material selected from vinylene carbonate, ethylene carbonate-based compounds of the following Chemical Formula 2, and combinations thereof.

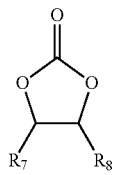

Chemical Formula 2

In Chemical Formula 2, $R_7$ and $R_8$ are the same or different, and each is independently selected from hydrogen, halogens, cyano groups (CN), nitro groups ($NO_2$), and C1 to C5 fluoroalkyl groups, provided that at least one of $R_7$ and $R_8$ is not hydrogen, i.e., at least one of $R_7$ and $R_8$ is selected from halogens, cyano groups (CN), nitro groups ($NO_2$), and C1 to C5 fluoroalkyl groups.

Nonlimiting examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like.

The material selected from vinylene carbonate, ethylene carbonate-based compounds of Chemical Formula 2, and combinations thereof may be included in the electrolyte in an amount of about 15 to about 30 volume % based on the entire amount of the non-aqueous electrolyte solvent. When the electrolyte includes this compound in an amount within this range, and the battery includes the above described negative active material, the batteries exhibit unexpectedly improved cycle-life characteristics, as discussed further below.

The lithium salt supplies the lithium ions in the battery, enables the basic operation of the rechargeable lithium battery, and improves lithium ion transport between the positive and negative electrodes. Nonlimiting examples of the lithium salt include supporting salts selected from $LiPF_6$, $LiBF_4$, $LiSbF_6$, $LiAsF_6$, $LiN(SO_2C_2F_5)_2$, $Li(CF_3SO_2)_2N$, $LiC_2F_5SO_3$, $LiC_4F_9SO_3$, $LiClO_4$, $LiAlO_2$, $LiAlCl_4$), LiN$(C_xF_{2x+1}SO_2)(C_yF_{2y+1}SO_2)$ (where x and y are natural numbers), LiCl, LiI, $LiB(C_2O_4)_2$ (lithium bisoxalato borate, LiBOB), and combinations thereof. The lithium salt may be used at a concentration of about 0.1 M to about 2.0 M. When the lithium salt is included at a concentration within this range, electrolyte performance and lithium ion mobility may be enhanced due to optimal electrolyte conductivity and viscosity.

The rechargeable lithium battery may further include a separator between the negative electrode and the positive electrode, as needed. Nonlimiting examples of suitable separator materials include polyethylene, polypropylene, polyvinylidene fluoride, and multi-layers thereof (such as polyethylene/polypropylene double-layered separators, polyethylene/polypropylene/polyethylene triple-layered separators, and polypropylene/polyethylene/polypropylene triple-layered separators).

Figure 3:
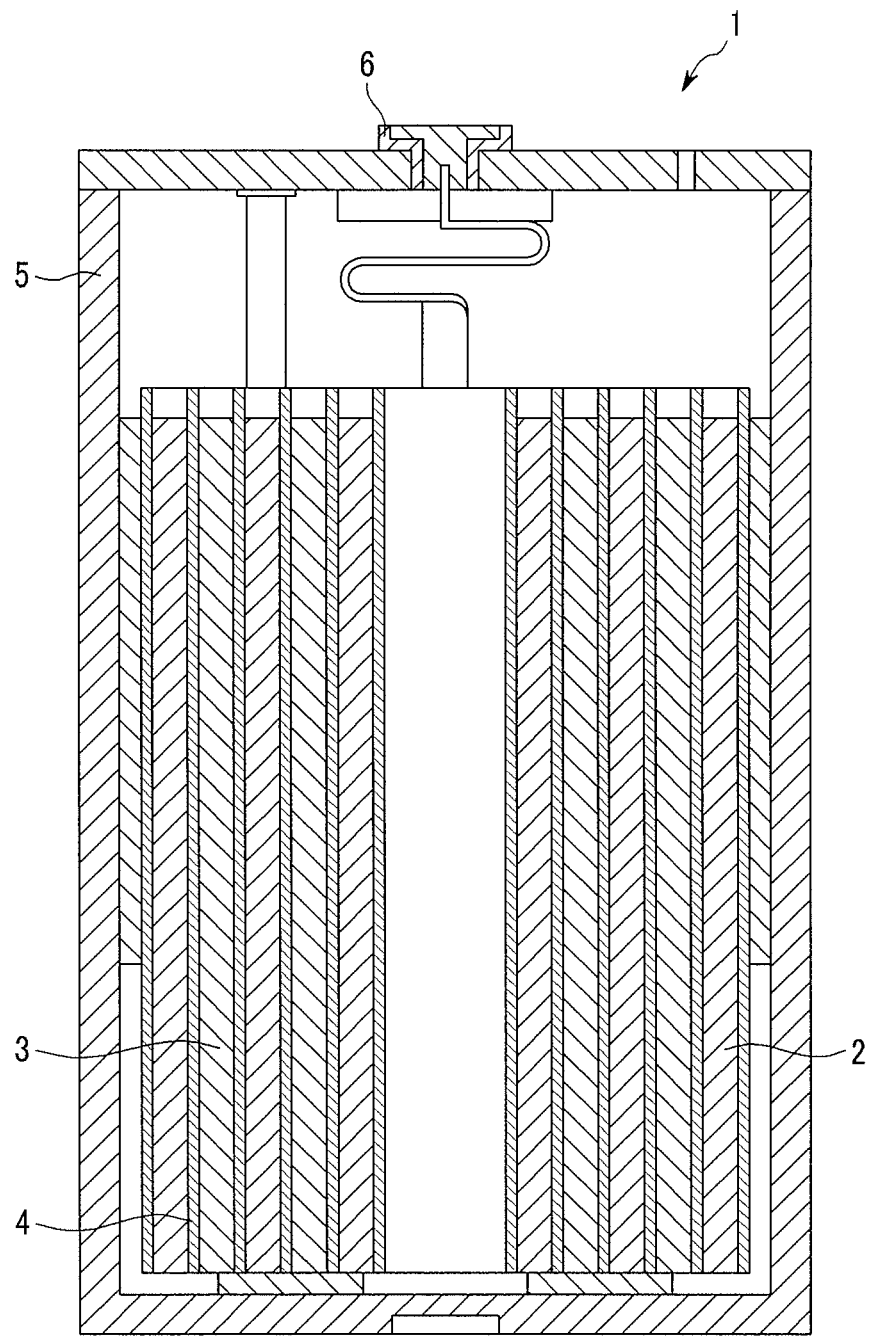
FIG. 3 is a cross-sectional view of a rechargeable lithium battery according to one embodiment of the present invention.

FIG. 3 is a cross-sectional view of a representative structure of a rechargeable lithium battery according to some embodiments of the present invention. As shown in FIG. 3, the rechargeable lithium battery 1 includes a battery case 5 housing an electrode assembly including a positive electrode 3, a negative electrode 2, and a separator between the positive electrode 3 and the negative electrode 2. An electrolyte solution is impregnated therein, and a sealing member 6 seals the battery case 5.

The following examples are provided for illustrative purposes only, and do not limit the scope of this disclosure.

Example 1

Si particles were ground for 150 hours using zirconia beads with a particle diameter of 100 μm, thereby preparing Si nanoparticles with an average particle diameter (D50) of 120 nm. The resultant Si nanoparticles had a full width at half maximum of 0.50° at the (111) plane as measured by X-ray diffraction using a CuKα ray. The X-ray diffraction analysis was performed using an X-ray with a Cu—Kα wavelength (1.5418 Å) (from X-ray diffraction equipment (model D8 advance) made by Bruker Inc.) at a scan rate of 0.2 degrees/min. In addition, the voltage and current of the X-ray tube were 40 KV and 40 mA, respectively. The divergence slit, anti-scatter slit, and receiving slit were designed to be 0.5°, 0.5°, and 0.2 mm, respectively.

Minute flake-shaped natural graphite particles with an average particle diameter of 3 μm were milled with a rotary mill, preparing a spherical natural graphite core with an average particle diameter of 15 μm. The natural graphite core included closed and open pores inside when the minute particles were agglomerated together during the milling process. Herein, the natural graphite core had a porosity of 15% after agglomeration.

Then, the Si nanoparticles were added to alcohol to prepare a Si nanoparticle dispersion solution, and then the natural graphite core was dipped in the Si nanoparticle dispersion solution to prepare a carbon-nanoparticle composite. The Si nanoparticles and natural graphite core had a weight ratio of 15:100.

Then, the carbon-nanoparticle composite was mixed with petroleum pitch. The mixture was heat-treated at 900° C. for 3 hours, preparing a negative active material. In the heat treatment process, the petroleum pitch was carbonized and converted into amorphous carbon and inserted inside the natural graphite core via the closed and open pores, and formed as a shell on the surface of the natural graphite core. The amorphous carbon was included in an amount of 10 wt % based on the entire amount of the negative active material.

The negative active material was mixed with styrene-butadiene rubber (SBR) binder and a carboxymethyl cellulose (CMC) thickener in a weight ratio of 97:2:1 in water, preparing a negative active material slurry. The negative active material slurry was coated on a Cu-foil current collector and then compressed, fabricating a negative electrode.

Then $LiCoO_2$, a polyvinylidene fluoride binder, and carbon black were mixed in a weight ratio of 96:3:3, preparing a positive active material slurry. The positive active material slurry was coated on an Al-foil current collector and then compressed, fabricating a positive electrode.

The negative and positive electrodes and a non-aqueous electrolyte were used to fabricate a prismatic battery cell. The non-aqueous electrolyte was prepared by dissolving 1.5M of $LiPF_6$ in a mixed solvent of ethylene carbonate (EC), fluoroethylene carbonate (FEC), dimethylcarbonate (DMC), and diethylcarbonate (DEC) in a volume ratio of 5:25:35:35.

Example 2

A prismatic battery cell was prepared as in Example 1, except that the Si particles were ground for 80 hours using zirconia beads with a particle diameter of 100 μm, thereby preparing Si nanoparticles with an average particle diameter (D50) of 140 nm. These Si nanoparticles were used in the method described in Example 1 to fabricate the prismatic battery cell. The Si nanoparticles had a full width at half maximum of 0.45° at the (111) plane as measured by X-ray diffraction carried out in the same manner as Example 1.

Example 3

A prismatic battery cell was prepared as in Example 1, except that the Si particles were ground for 60 hours using zirconia beads with a particle diameter of 100 μm, thereby preparing Si nanoparticles with an average particle diameter (D50) of 160 nm. These Si nanoparticles were used in the method described in Example 1 to fabricate the prismatic battery cell. The Si nanoparticles had a full width at half maximum of 0.40° at the (111) plane as measured by X-ray diffraction carried out in the same manner as Example 1.

Example 4

A prismatic battery cell was prepared as in Example 1, except that the Si particles were ground for 40 hours using zirconia beads with a particle diameter of 100 μm, thereby preparing Si nanoparticles with an average particle diameter (D50) of 180 nm. These Si nanoparticles were used in the method described in Example 1 to fabricate the prismatic battery cell. The Si nanoparticles had a full width at half maximum of 0.35° at the (111) plane as measured by X-ray diffraction carried out in the same manner as Example 1.

Example 5

A prismatic battery cell was fabricated as in Example 1, except that the negative active material slurry was prepared by mixing the negative active material of Example 1 with artificial graphite in a weight ratio of 1:4.

Comparative Example 1

A prismatic battery cell was prepared as in Example 1, except that the Si particles were ground for 40 hours using zirconia beads with a particle diameter of 250 μm, thereby preparing Si nanoparticles with an average particle diameter (D50) of 160 nm. These Si nanoparticles were used to fabricate a prismatic battery cell according to the same method as Example 1. The Si nanoparticles had a full width at half maximum of 0.30° at the (111) plane as measured by X-ray diffraction carried out in the same manner as Example 1.

Comparative Example 2

A prismatic battery cell was prepared as in Example 1, except that the Si particles were ground for 40 hours using zirconia beads with a particle diameter of 500 μm, thereby preparing Si nanoparticles with an average particle diameter (D50) of 160 nm. These Si nanoparticles were used to fabricate a prismatic battery cell according to the same method as Example 1. The Si nanoparticles had a full width at half maximum of 0.28° at the (111) plane as measured by X-ray diffraction carried out in the same manner as Example 1.

Figure 4:
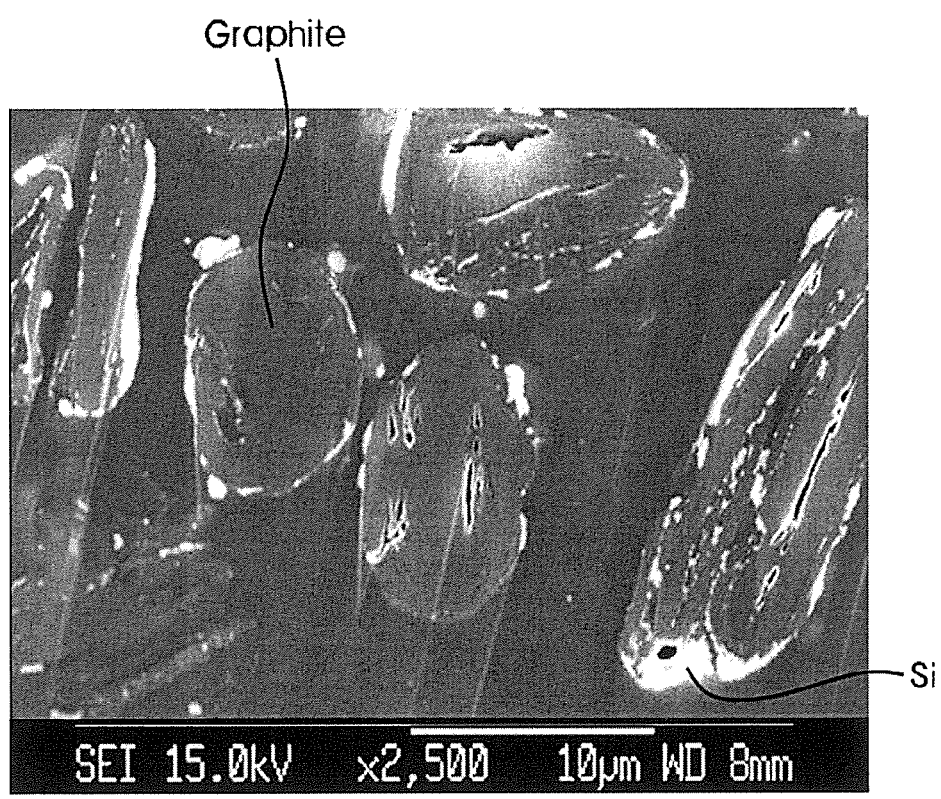
FIG. 4 is a scanning electron microscope (SEM) photograph of the negative active material prepared according to Example 1.

FIG. 4 is a scanning electron microscope (SEM) photograph of the negative active material according to Example 1. FIG. 4 shows Si nanoparticles inside the pores or on the surface of graphite.

The prismatic battery cells according to Examples 1 to 4 and Comparative Examples 1 and 2 were charged at 1 C to a charge cut-off voltage of 4.35V, and discharged at 1 C to a discharge cut-off voltage of 2.5V to perform a charge and discharge experiment. The results are provided in the following Table 1.

TABLE 1

| | Full width at half maximum (degrees) at (111) plane | Si D50 particle size (PSA) | Cycle-life (capacity at $100^{th}$ cycle/capacity at $1^{st}$ cycle) |
|---|---|---|---|
| Example 1 | 0.50 | 120 nm | 94% |
| Example 2 | 0.45 | 140 nm | 93% |
| Example 3 | 0.40 | 160 nm | 90% |
| Example 4 | 0.35 | 180 nm | 87% |
| Comparative Example 1 | 0.30 | 160 nm | 70% |
| Comparative Example 2 | 0.28 | 160 nm | 73% |

As shown in Table 1, the cells including the negative active materials according to Examples 1 to 4 had significantly improved cycle-life characteristics compared with the cells of Comparative Examples 1 and 2. In particular, as shown in Table 1, cells including negative active materials with Si nanoparticles having a FWHM of 0.35 degree or greater exhibit unexpectedly better (i.e., from 14 to 24% better) capacity retention (cycle-life).

Examples 6-11 and Comparative Example 3

Prismatic battery cells were fabricated according to Example 1, but with different electrolyte compositions. In particular, the solvent compositions of the electrolyte were varied as shown in the following Table 2 in order to evaluate cycle-life characteristics as a function of the solvent composition of the non-aqueous electrolyte solution. For comparison, the cell including negative active materials with Si nanoparticles having a FWHM of 0.28 degree and excluding FEC in a solvent according to Comparative Example 3 are also fabricated. The cells prepared according to Example 1, Examples 6 to 11 and Comparative Example 0.3 were charged at 1 C to a charge cut-off voltage of 4.35V and discharged at 1 C to a discharge cut-off voltage of 2.5V to evaluate cycle-life. The results are provided in Table 2.

TABLE 2

|  | Full width at half maximum (degrees) at (111) plane | EC (vol %) | FEC (vol %) | DMC (vol %) | DEC (vol %) | Cycle-life (capacity at 100$^{th}$ cycle/capacity at 1$^{st}$ cycle) |
|---|---|---|---|---|---|---|
| Example 1 | 0.40 | 5 | 25 | 35 | 35 | 94% |
| Example 6 | 0.40 | 0 | 30 | 30 | 40 | 95% |
| Example 7 | 0.40 | 10 | 20 | 50 | 20 | 90% |
| Example 8 | 0.40 | 15 | 15 | 45 | 25 | 87% |
| Example 9 | 0.40 | 20 | 10 | 40 | 30 | 80% |
| Example 10 | 0.40 | 5 | 45 | 30 | 20 | 83% |
| Example 11 | 0.40 | 20 | 0 | 30 | 50 | 80% |
| Comparative Example 3 | 0.28 | 20 | 0 | 30 | 50 | 65% |

As shown in Table 2, the cells of Example 1 and Examples 6 to 8 including FEC in an amount ranging from 15 to 30 volume % had significantly improved cycle-life characteristics compared with the cells prepared according to Examples 9 and 10, in which the FEC was included in an amount outside that range and the cells according to Example 11 and Comparative Example 3 in which the FEC was not included. In particular, as shown in Table 2, cells including the negative active material of Example 1 and FEC in an amount of about 15 to about 30 volume % exhibit unexpectedly better (i.e., from 4 to 15% better) capacity retention (cycle-life).

While the present invention has been described in connection with certain exemplary embodiments, it is understood by those of ordinary skill in the art that certain modifications may be made to the described embodiments without departing from the spirit and scope of the present invention, as defined by the appended claims.

What is claimed is:

1. A negative active material for a rechargeable lithium battery, comprising a carbon-nanoparticle composite comprising:
   a crystalline carbon material having pores; and
   amorphous conductive nanoparticles comprising silicon nanoparticles having a full width at half maximum at a (111) plane of about 0.35° to about 0.5° as measured by X-ray diffraction, wherein at least some of the amorphous conductive nanoparticles are inside the pores of the crystalline carbon material, or both inside the pores and on the surface of the crystalline carbon material, the amorphous conductive nanoparticles being present in an amount of about 5 to about 25 parts by weight based on 100 parts by weight of the crystalline carbon material, and having an average particle diameter of about 50 nm to about 200 nm.

2. The negative active material of claim 1, wherein the crystalline carbon material comprises a material selected from the group consisting of natural graphite, artificial graphite, and combinations thereof.

3. The negative active material of claim 1, wherein the crystalline carbon material has a porosity of about 15% to about 50%.

4. The negative active material of claim 1, further comprising amorphous carbon at least partially surrounding the carbon-nanoparticle composite.

5. The negative active material of claim 4, wherein the amorphous carbon is in at least one pore of the crystalline carbon material.

6. The negative active material of claim 5, wherein the amorphous carbon is between a surface of the crystalline carbon and at least one of the amorphous conductive nanoparticles.

7. The negative active material of claim 4, wherein the amorphous carbon comprises a material selected from the group consisting of soft carbon, hard carbon, a mesophase pitch carbonized product, baked coke, and combinations thereof.

8. The negative active material of claim 4, wherein the amorphous carbon is present in the negative active material in an amount of about 5 to about 25 parts by weight based on 100 parts by weight of the crystalline carbon material.

9. The negative active material of claim 1, wherein the crystalline carbon material comprises fine powders having a particle size of about 1 μm to about 5 μm.

10. The negative active material of claim 1, wherein the negative active material has an average particle diameter ranging from about 5 to about 40 μm.

11. A rechargeable lithium battery, comprising:
    a negative electrode comprising a negative active material comprising a carbon-nanoparticle composite comprising:
       a crystalline carbon material having pores, and
       amorphous conductive nanoparticles comprising silicon nanoparticles having a full width at half maximum at a (111) plane of about 0.35° to about 0.5° as measured by X-ray diffraction, wherein at least some of the amorphous conductive nanoparticles are inside the pores of the crystalline carbon material, or both inside the pores and on the surface of the crystalline carbon material, the amorphous conductive nanoparticles being present in an amount of about 5 to about 25 parts by weight based on 100 parts by weight of the crystalline carbon material, and having an average particle diameter of about 50 nm to about 200 nm;
    a positive electrode comprising a positive active material; and
    a non-aqueous electrolyte.

12. The rechargeable lithium battery of claim 11, wherein the crystalline carbon material comprises a material selected from the group consisting of natural graphite, artificial graphite, and combinations thereof.

13. The rechargeable lithium battery of claim 11, wherein the crystalline carbon material has a porosity of about 15% to about 50%.

14. The rechargeable lithium battery of claim 11, further comprising amorphous carbon at least partially surrounding the carbon-nanoparticle composite.

15. The rechargeable lithium battery of claim 14, wherein the amorphous carbon comprises a material selected from the group consisting of soft carbon, hard carbon, a mesophase pitch carbonized product, baked coke, and combinations thereof.

16. The rechargeable lithium battery of claim 14, wherein the amorphous carbon is present in the negative active material in an amount of about 5 to about 25 parts by weight based on 100 parts by weight of the crystalline carbon.

17. The rechargeable lithium battery of claim 11, wherein the non-aqueous electrolyte comprises a non-aqueous organic solvent and a lithium salt, wherein the non-aqueous organic solvent comprises a material selected from the group consisting of vinylene carbonate, ethylene carbonate based compounds represented by Formula 2, and combinations thereof:

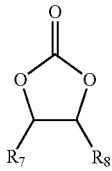

Formula 2 wherein each of $R_7$ and $R_8$ is independently selected from the group consisting of hydrogen, halogens, cyano groups, nitro groups, and C1 to C5 fluoroalkyl groups, provided that at least one of $R_7$ and $R_8$ is not hydrogen.

18. The rechargeable lithium battery of claim 17, wherein the material selected from the group consisting of vinylene carbonate, ethylene carbonate based compounds represented by Formula 2, and combinations thereof is present in the electrolyte in an amount of about 15 to about 30 volume % based on a total volume of the non-aqueous organic solvent.

* * * * *